United States Patent [19]

Ueda

[11] 4,441,998

[45] Apr. 10, 1984

[54] WATER PURIFICATION DEVICE

[75] Inventor: Yoshihiko Ueda, Yamaguchi, Japan

[73] Assignee: Takara Kogyo Co., Ltd., Tokyo, Japan; a part interest

[21] Appl. No.: 410,920

[22] Filed: Aug. 24, 1982

[30] Foreign Application Priority Data

Mar. 12, 1982 [JP] Japan .................................. 57-39092

[51] Int. Cl.³ ............................................. B01D 23/16
[52] U.S. Cl. .................................... 210/275; 210/279
[58] Field of Search ......................... 210/263, 273–275, 210/277, 279, 792, 269

[56] References Cited

U.S. PATENT DOCUMENTS 961,180  6/1910  Utley ................................... 210/279

Primary Examiner—Frank Sever
Attorney, Agent, or Firm—Wenderoth, Lind & Ponack

[57] ABSTRACT

A water purification device includes a plurality of tiers of flow channel or passage defining plates along the inner surface of the wall of a filter tank, a water collecting strainer at about the center of the tank for collecting purified water, and raw water distribution conduit means for distributing and supplying raw water to the respective flow channels. Since raw water permeates into the filter layer in the tank not only from above but from below and from the peripheral zone of the tank, and the purified water is collected at the center and drawn to the outside, the filtration efficiency is improved as compared to the case where raw water is permeated into the filter medium from above and the purified water is collected at the bottom of the tank.

12 Claims, 5 Drawing Figures 4,441,998

WATER PURIFICATION DEVICE

FIELD OF THE INVENTION

This invention relates to a water purification device, and more particularly to such a water purification device wherein water to be filtered is permeated into the filter layer from the periphery thereof and the water thus filtered is collected at the center for increasing the filtration area and filtration efficiency.

DESCRIPTION OF THE PRIOR ART

In the conventional water purification devices, usually the water to be filtered is permeated from the upper end face of the filter medium in the filter tank, and the filtered water thus obtained through filtration is collected from the lower end face of the filter medium in the tank.

In this known device, since the filter layer is arranged vertically as a column, filtration occurs only near the upper end face of the column, although the major portion of the filter layer is in the activated state. Thus, the upper end face of the filter layer may be clogged, making it necessary to frequently wash the filter medium, which results in lowered filtration efficiency.

OBJECT OF THE INVENTION

In view of these deficiencies of the prior art, the present invention seeks to provide a water purification device wherein water to be filtered is permeated from the peripheral side of the body of filter medium in the tank for increasing filtration area and efficiency and reducing the number of times washing is necessary.

DESCRIPTION OF PREFERRED EMBODIMENTS

Figure 1:
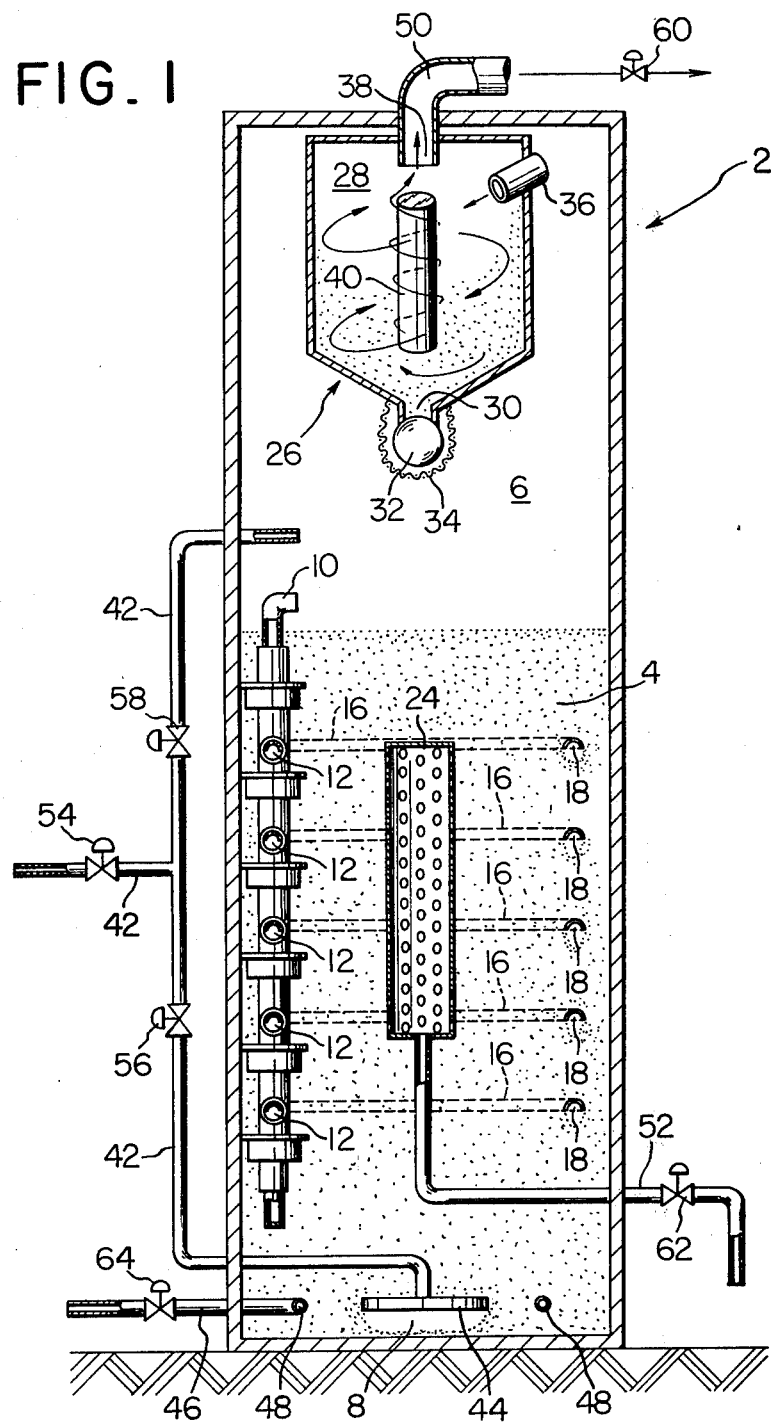
FIG. 1 is a longitudinal sectional view showing a device according to the first embodiment of the invention.
Figure 2:
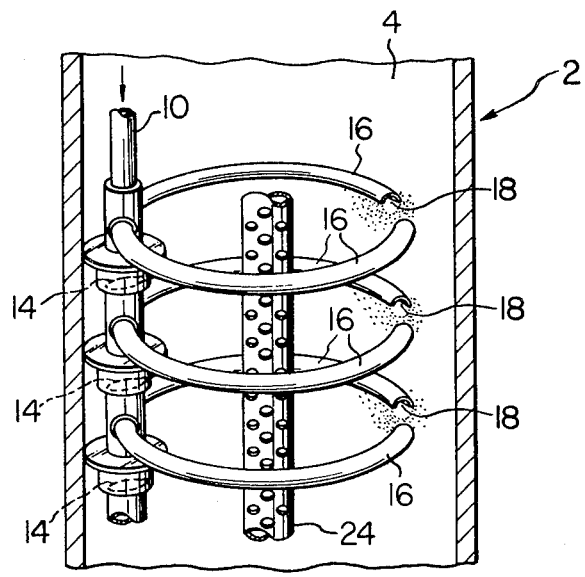
FIG. 2 is a perspective view showing a portion of the device shown in FIG. 1.
Figure 3:
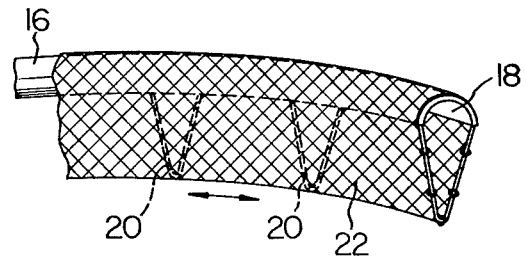
FIG. 3 is a perspective view showing a flow passage defining plate fitted with filter means.

FIGS. 1 to 3 illustrate a first embodiment of the present invention. A granular filter medium such as filter sand is heaped in a filter tank 2 for forming a filter layer 4, and chambers 6 and 8 for the water to be filtered, hereinafter called raw water, are provided above and below the filter layer 4. A distribution conduit 10 is embedded in one side of the layer 4 and is open to and projects into the raw water chamber 6 at the top and is closed at the bottom. A plurality of distribution ports 12 are formed in the conduit and a check valve 14 is mounted in the proximity of each port 12 for prohibiting the granular filter medium from flowing into conduit 10. Flow passage defining plates 16 extend from the respective ports 12 and along the inner surface of the wall of the filter tank 2, said plates having a cross-sectional shape of an angle, plate, or a semicircle as shown. Thus a plurality of flow passages connected to the distribution ports 12 are defined in tiers in the filter layer 4 along the inner surface of the wall of the tank 2. Means as shown in FIG. 3 may be used for enlarging the cross-sectional area of the flow passages 18 for the raw water and hence the filter area.

Such means include sliding contact members 20 mounted on the underside of the plates 16 and a filter mesh 22 made from nylon in the form of a tube or pouch and engaged around said sliding contact members 20. during washing, due to vibrations of the filter medium and hence of the filter mesh 22, sliding contact occurs between the filter medium and the outer surface of the filter mesh 22 and between the members 20 and the inner surface of the filter mesh 22, so that the inner and outer surfaces of the filter mesh 22 are washed and freed of any contaminants. The raw water passages 18 are open at their terminal ends for discharging contaminants of coarse particle sizes.

A perforated water collector strainer 24 for collection of filtered water is mounted vertically at the center of the filter layer 4.

A separation unit 26 is mounted towards the top of the chamber 6 and used at the time of washing of the filter medium for centrifugally separating the granular filter medium from the contaminated washing water. The unit 26 has a separation chamber 28 with a circular or a polygonal cross-section, and a hopper-like bottom, in the lower end of which is provided a return port 30 for returning the filter medium precipitated in the chamber 28 to the filter bed 4. A float valve 32 in the form of a ball is mounted on the port 30 and urged by its own buoyancy to close the port 30. A mesh basket 34 is mounted on the bottom of unit 26 for retaining the valve 32 against loss. A short tube section 36 is mounted at the shoulder of a separation chamber 28 for communication with the raw water chamber 6, said tube 36 being approximately tangential to the peripheral wall of the chamber 28 for generating a powerful gyratory flow in the chamber 28. A communication port 38 is mounted at the upper center of the separation chamber 28, and a separation rod 40 is mounted vertically at the center of the separation chamber 28. The separation rod 40 is spaced a predetermined distance from the discharge pipe 38 and has a predetermined diameter which in the present embodiment is larger than that of the discharge pipe 38. The rod is designed to produce a gyratory water flow to effect a centrifugal separation of the granular filter medium.

The numeral 42 denotes a branched raw water supply pipe opening at the upper end into the raw water chamber 6 and opening at the lower end into the raw water chamber 8 defined by a dispersion plate 44. The numeral 46 denotes an air supply tube which is connected to a circular air injection pipe 48 in the lower portion of the filter layer 4. A water discharge pipe 50 extends from the port 38 in the separation chamber 28 and a water collection pipe 52 extends from strainer 24. The numerals 54, 56, 58, 60, 62, 64 denote first, second, third, fourth, fifth and sixth valves.

The device thus shown and described operates as follows. First, for water filtration, the first, second, third and fifth valves 54, 56, 58, 62 are opened, the fourth and sixth valves 60, 64 are closed and raw water is supplied into chambers 6 and 8 through supply pipe 4. Raw water from the chambers 6 and 8 permeates into filter layer 4 from above and below to be purified by filtration. Part of the stored water flows via distribution pipe 10 and ports 12 into crude water passages 18 to be permeated from these passages 18 into the filter layer 4 and into strainer 24. This part of the raw water is thus purified by filtration along the periphery of the filter layer. The water thus purified through filtration on the upper and lower surfaces and the periphery of the filter layer 4 is collected by the strainer 24 and the collection pipe 52. The filtration speed and efficiency as well as filtration capacity is thus be increased by reason of the increased surface area.

For washing, should the filter layer 5 be clogged due to repeated usage, the first, second, fourth and sixth valves 54, 56, 60, 64 are opened and the third and fifth valves 58, 62 are closed. Raw water is then supplied as washing water to the bottom of the filter layer 4, while air is also supplied for washing the granular filter medium, so that contaminants can be removed. Polluted water in the form of air bubbles and the granular filter medium are mixed together and whirled up into raw water chamber 6 to then flow into separation chamber 28 by way of pipe section 36. This washing water flows spirally along the inner wall of the separation chamber 28 to descend during gyration. The granular filter medium entrained in the water is separated centrifugally from the water and flows in gyration along said inner wall to be precipitated and heaped on the bottom. During such washing, float valve 32 closes the port 30 due to its buoyancy. The direction of flow of the descended washing water is reversed at the bottom to then rise in a gyrating flow along the periphery of the separation rod 40 and is discharged to the outside through port 38 and water discharge pipe 50. Such rising water current has a diameter larger than the diameter or thickness of the rod 40 because the rod 40 itself has a predetermined diameter or thickness. Thus, even supposing that part of the granular filter medium is whirled up from the bottom along with the rising water current, the filter medium is thrown out and transferred to the helical flow due to the centrifugal force corresponding to the rotational diameter of the rising water current. Thus the filter medium is subjected to further separation and is precipitated on the bottom. Thus, the entrained granular filter medium is prevented from flowing to the outside along with discharge water. After conjoint washing by air and water, the granular filter medium is subjected to finish washing only with washing water.

When the filter medium precipitated on the bottom of the separation chamber 28 has reached a predetermined weight, float valve 32 is opened against its buoyancy, and the precipitated filter medium is now returned to the filter layer 4.

Figure 4:
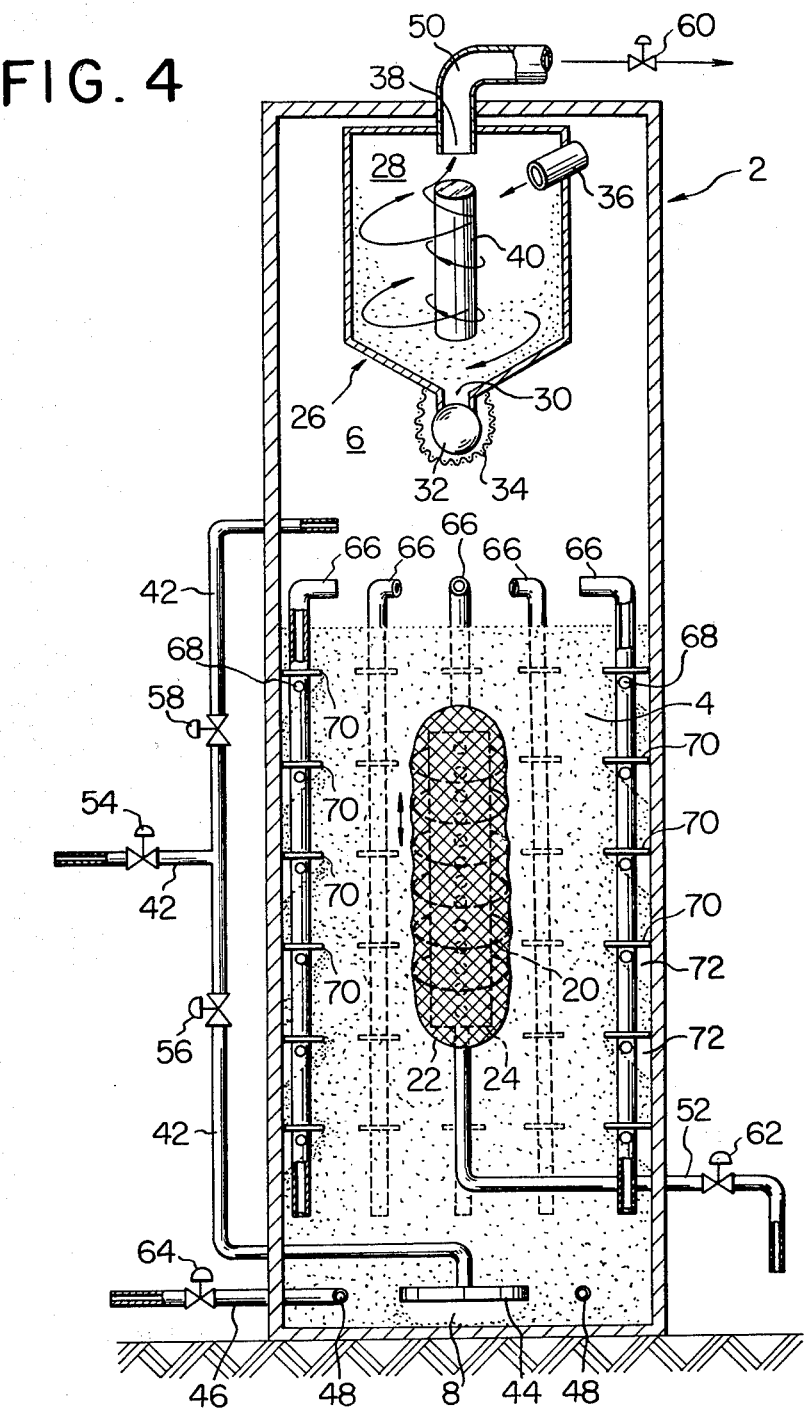
FIG. 4 is a longitudinal sectional view showing a device according to the second embodiment of the invention.
Figure 5:
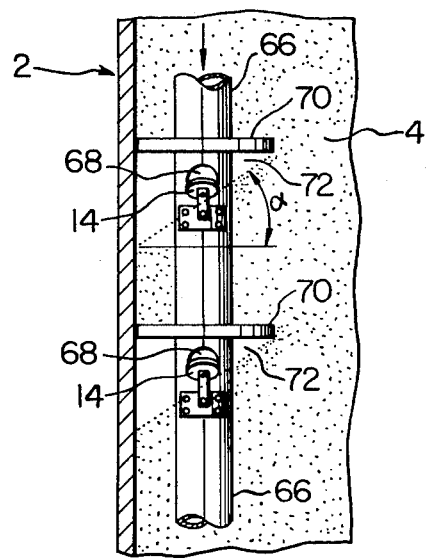
FIG. 5 is a front view showing a portion of the device shown in FIG. 4.

FIGS. 4 and 5 illustrate the second embodiment of the present invention, which is similar to the above first embodiment except for the following.

A plurality of raw water distribution conduits 66 are arranged symmetrically along and are equally spaced around the inner wall of the filter tank 2, each said conduit 66 having an upper end open to and projecting into raw water chamber 6 and a lower end which is closed. Distribution ports 68 are provided at fixed intervals along each conduit and are povided with check valves 14. A flow passage defining plate 70 in the form of a disc is mounted directly above each said port 68 for defining a raw water passage 72 in the filter layer 4, said passage 72 having a rest angle α. As in the case of flow passage defining plates 16 shown in FIG. 3, the strainer 24 is surrounded by a filter mesh 22 with interposed sliding contact members 20 to prevent clogging of the strainer 24.

The operation of the second embodiment is not described because it is identical with the operation of the preceding embodiment.

It is to be noted that the present invention is not limited to the above embodiments but may comprise various modifications. Thus the upper open end of the raw water supply pipe may directly communicate with the upper end of the raw water distribution conduit. Alternatively, the lower open end of the raw water supply pipe may be connected to the lower end of the raw water distribution conduit the upper end of which is then closed.

From the foregoing it is seen that a plurality of tiers of the flow passage defining plates are mounted along the inner surface of the wall of the filter tank for defining raw water passages in the filter layer, so that filtration speed as well as filtration capacity can be increased with a reduced number of times of washing. Moreover, filtration accuracy can be improved, and highly purified water may be obtained. In addition, the present invention is useful for a wide variety of types of raw water.

What is claimed is:

1. A water purification device for filtering raw water, comprising:
    a filter tank having a major dimension and designed and dimensioned to hold a body of filter medium which substantially fills said tank, said tank having raw water inlet means and filtered water outlet means;
    a plurality of flow passage defining means mounted in said filter tank and spaced at intervals along the inner peripheral surface of the sidewall of said filter tank in the direction of the major dimension of said filter tank, said flow passage defining means being designed and dimensioned for defining a plurality of raw water flow passages in said filter medium which extend along said flow passage defining means;
    raw water supply means connected to said flow passage defining means for supplying raw water from said inlet means into said raw water flow passages from which the raw water disperses laterally from the flow passages into the filter medium; and
    a water collection strainer mounted substantially centrally in said filter tank and extending in the direction of the major dimension and being positioned radially inwardly of said flow passage defining means and connected to said water outlet means for collecting purified water flowing through the filter medium from said raw water passages, the flow passage defining means and the water collection strainer being positioned relative to each other and designed and dimensioned for causing the laterally dispersed raw water from the flow passages to flow radially inwardly through the filter medium to utilize and annular layer of the filter medium extending in the direction of the major dimension for initial filtration and thereby increasing the efficiency of utilization of the filter medium as compared to simply filtering the raw water by flowing it through the filter medium in the direction of the major dimension.

2. A water purification device according to claim 1, each of said flow passage defining members comprises a substantially semicylindrical downwardly facing trough extending annularly along the sidewall, said supply means comprising a conduit extending parallel to the axis of said filter tank and having a plurality of distribution ports, each of said troughs having an end fitted in one of said distribution ports.

3. A water purification device according to claim 2, wherein said conduit has a plurality of check valves positioned therein adjacent to the respective distribution ports for preventing the filter medium from flowing into said conduit.

4. A water purification device according to claim 2, wherein said water collection strainer comprises an elongated perforated pipe extending axially in said filter tank and surrounded by at least one of said troughs.

5. A water purification device according to claim 2, wherein said conduit has a closed end in said filter medium and an opposite open end in said raw water chamber.

6. A water purification device according to claim 2, wherein said flow passage defining members further comprises a plurality of sliding contact members mounted at spaced intervals along each of said troughs and a filter mesh in the form of a tube slidably engaged about said trough and said sliding contact members.

7. A water purification device according to claim 1, wherein said supply means comprises a plurality of conduits extending parallel to the axis of said filter tank and spaced at angular intervals along the sidewall of said filter tank, each of said conduits having a plurality of distribution ports, each of said flow passage defining members comprising a disc-shaped plate attached to the corresponding conduit adjacent to one of said distribution ports.

8. A water purification device according to claim 7, wherein each of said conduits has a plurality of check valves positioned adjacent the respective distribution ports for preventing said filter medium from entering the conduit.

9. A water purification device according to claim 7, wherein said water collection strainer comprises an elongated perforated pipe extending axially in said filter tank and surrounded by said conduits.

10. A water purification device according to claim 9, wherein said water collection strainer further comprises a plurality of sliding contact members fixed at spaced intervals to said elongated perforated pipe and a filter mesh in the form of a pouch slidably engaging about said sliding contact members.

11. A water purification device according to claim 7, wherein when said filter medium is in said tank it has an upper surface spaced below the top of said filter tank to define a raw water chamber above the filter medium, and each of said conduits having a closed end in said filter medium and an opposite open end in said raw water chamber.

12. A water purification device according to claim 1, including means mounted in said filter tank at one end thereof for cleaning said filter medium.

* * * * *